US012555735B2

(12) United States Patent
Freudenberger et al.

(10) Patent No.: US 12,555,735 B2
(45) Date of Patent: Feb. 17, 2026

(54) X-RAY TUBE HAVING AT LEAST ONE ELECTRICALLY CONDUCTIVE HOUSING SECTION

(71) Applicant: Siemens Healthineers AG, Forchheim (DE)

(72) Inventors: Joerg Freudenberger, Kalchreuth (DE); Wolfgang Schaeff, Burgthann (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 341 days.

(21) Appl. No.: 18/461,618

(22) Filed: Sep. 6, 2023

(65) Prior Publication Data

US 2024/0087834 A1 Mar. 14, 2024

(30) Foreign Application Priority Data

Sep. 7, 2022 (DE) ..................... 10 2022 209 314.3

(51) Int. Cl.

| | |
|---|---|
| ***H01J 35/16*** | (2006.01) |
| ***H05G 1/02*** | (2006.01) |
| ***H05G 1/26*** | (2006.01) |
| ***H05G 1/54*** | (2006.01) |

(52) U.S. Cl.

CPC ............. *H01J 35/16* (2013.01); *H05G 1/025* (2013.01); *H05G 1/265* (2013.01); *H05G 1/54* (2013.01)

(58) Field of Classification Search

CPC ....................................................... H01J 35/16

See application file for complete search history.

(56) References Cited

U.S. PATENT DOCUMENTS

| | | | | |
|---|---|---|---|---|
| 4,499,592 | A * | 2/1985 | Brettschneider | H01J 35/02 313/313 |
| 5,159,618 | A | 10/1992 | Blake | |
| 5,159,697 | A | 10/1992 | Wirth | |
| 5,575,953 | A | 11/1996 | Tachizono et al. | |
| 11,257,652 | B2 | 2/2022 | He et al. | |
| 12,225,655 | B2 * | 2/2025 | Freudenberger | A61B 6/03 |
| 2011/0075802 | A1 | 3/2011 | Beckmann et al. | |

(Continued)

FOREIGN PATENT DOCUMENTS

| | | |
|---|---|---|
| DE | 69200536 T2 | 6/1995 |
| DE | 69122363 T2 | 4/1997 |

(Continued)

OTHER PUBLICATIONS

Elektrische Leitfähigkeit; freie Enzyklopädie Wikipedia https://de.wikipedia.org/wiki/Elektrische_Leitfähigkeit.

*Primary Examiner* — Chih-Cheng Kao

(74) *Attorney, Agent, or Firm* — Harness, Dickey & Pierce, P.L.C.

(57) ABSTRACT

The invention relates to an X-ray tube, an X-ray source and an X-ray facility. The X-ray tube may have a vacuum housing having at least one side surface, the vacuum housing comprises a cathode and an anode for generating X-rays. An acceleration path for emitted electrons is provided between the cathode and the anode via an applied high voltage. A first of the at least one side surface has a first electrically conductive housing section having a temperature dependent electrical conductivity so that an essentially linear potential curve is set along the acceleration path.

20 Claims, 10 Drawing Sheets

(56) References Cited

U.S. PATENT DOCUMENTS

| | | | | |
|---|---|---|---|---|
| 2014/0369467 | A1 * | 12/2014 | Yamazaki ................. | H01J 9/26<br>156/287 |
| 2022/0148841 | A1 | 5/2022 | Parker et al. | |
| 2023/0031968 | A1 | 2/2023 | Geithner et al. | |

FOREIGN PATENT DOCUMENTS

| | | | |
|---|---|---|---|
| DE | 19811931 | C2 | 3/2000 |
| DE | 69519536 | T2 | 7/2001 |
| DE | 102017214196 | A1 | 2/2019 |
| DE | 202021106047 | U1 | 2/2022 |
| EP | 0676787 | A2 | 10/1995 |
| WO | WO-2008156361 | A2 * | 12/2008 |
| WO | WO 2018092939 | A1 | 5/2018 |

* cited by examiner

X-RAY TUBE HAVING AT LEAST ONE ELECTRICALLY CONDUCTIVE HOUSING SECTION

CROSS-REFERENCE TO RELATED APPLICATION(S)

The present application claims priority under 35 U.S.C. § 119 to German Patent Application No. 10 2022 209 314.3, filed Sep. 7, 2022, the entire contents of which are incorporated herein by reference.

FIELD

One or more example embodiments of the present invention relates to an X-ray tube, an X-ray source and an X-ray facility.

RELATED ART

In the case of an X-ray tube, typically a vacuum is used for the insulation between an anode and a cathode. For this purpose, a vacuum housing of the X-ray tube comprises the cathode and the anode and a high vacuum is typically present in the vacuum housing. In the case of X-ray sources having multiple X-ray tubes, advantageously a spacing between the multiple X-ray tubes is small in order to reduce the spacing between the primary focal spots and consequently the X-rays. The insulation of the multiple X-ray tubes from one another precludes such an embodiment having a small spacing.

A conventional vacuum housing usually comprises (highly) insulating parts as a conventional insulator in order to electrically insulate the high voltage that can be applied between the anode and the cathode so as to accelerate the emitted electrons. The emitted electrons are in particular primary electrons. Such an insulator comprises or is made usually of glass or ceramic. During operation of the X-ray tube, typically electrical charges and/or leakage currents occur on a surface of a conventional insulator. A leakage path for the leakage currents typically has a length of at least 1 mm/kV of the high voltage whereby the conventional insulator is dimensioned as comparatively large. Alternatively or in addition thereto, shielding elements are conventionally used. A shielding element can absorb for example scattered electrons prior to an interaction with the insulator and/or can avoid an influence of the charges on the emitted electrons. The charges generate in particular namely electrical fields that can deflect the emitted electrons.

A fundamental criterion for a quality of the X-ray tube is as small as possible an extra focal radiation. The latter occurs in particular on account of the fact that the emitted electrons at the anode are scattered back by the primary focal spot and impinge again outside of the primary focal spot on the anode so as to generate the extra focal radiation. The proportion of extra focal radiation is in particular increased in the case of such X-ray tubes in which the anode is at high voltage potential and consequently a large part up to essentially all of the back scattered electrons can impinge again on the anode and/or in which the cathode has multiple spatially distributed electron emitters and consequently a multiple scattering of the emitted electrons can occur.

WO 2018/092 939 A1 discloses a field emission X-ray source apparatus comprising: a tube-shaped vacuum container; an anode having a target and a cathode having an electron emitter, which are arranged in each case on the ends of the tube-shaped vacuum container; and a gate electrode that is arranged between the anode and the cathode, wherein at least one electric arc protection pin is included, which protrudes from the cathode and penetrates the gate electrode, wherein at least one through hole is formed in the gate electrode so as to render possible the penetration of the electric arc pin.

The publication DE 69 519 536 T2 describes a coating composition for the inner wall of a cathode ray tube, which is essentially made from an aqueous dispersion of the following: Potassium silicate, a dispersion means and (a) graphite particles or (b) a combination of graphite particles and metal oxide or metal carbide particles that are held in the aqueous dispersion, wherein the molar ratio of silicon dioxide to potassium oxide in the potassium silicate is in the range of 4 to 4.5.

An X-ray tube is known from the publication DE 2020/21 106 047 U1 comprising: a cathode and an anode that are electrically insulated from one another; a housing that is fastened to the cathode and the anode, wherein the housing electrically insulates the cathode from the anode; a coating ring on an inner surface of the housing, wherein the coating ring adjoins the cathode, wherein the coating ring surrounds a longitudinal axis of the housing, wherein the longitudinal axis extends between the cathode and the anode; an interrupting ring that is located on the inner surface of the housing, wherein the interrupting ring surrounds the longitudinal axis, wherein the interrupting ring is different from the coating ring; an electrical current path through the coating ring and the interrupting ring in series; with $RI>RC$, wherein RI is the electrical resistance per length unit through the interrupting ring and RC is the electrical resistance per length unit through the coating ring, both measured parallel to the longitudinal axis and $\rho C<\rho E$, wherein $\rho C$ is a specific electrical volume resistance of the coating ring and $\rho E$ is a specific electrical volume resistance of the housing.

An arrangement for an X-ray imaging system including a vacuum tube having a cathode and an anode, which emits X-ray radiation as the vacuum tube is excited, and a housing that surrounds the vacuum tube and has first and second electrical connectors that extend through the housing, wherein the connectors in each case are connected to another of the anode and the cathode, characterised in that the housing is electrically conductive and is provided with a resistance coating on its inner surface in order to reduce the quality factor Q of a resonance chamber that is formed by the housing and the vacuum tube, wherein the first and second electrical connectors are insulated from the housing, is disclosed in the publication DE 69 200 536 T2.

The publication U.S. Pat. No. 11,257,652 B2 describes a method for producing an X-ray tube, wherein the X-ray tube comprises a frame, an anode, a cathode and at least one insulator that surrounds the cathode, wherein the method comprises the steps of fastening the at least one insulator to at least one carrier by hard soldering using a filling material then applying a first layer of a conductive dissipative coating to a surface of the insulator using a vapor deposition process, wherein the vapor deposition process uses a lower temperature than the melting point temperature of the filling material, wherein the conductive dissipative coating is configured so that it reduces an electrical charge buildup on the at least one insulator.

The publication DE 10 2017/214 196 A1 relates to a method for operating an X-ray system and also an X-ray system, which is suitable for this method, having an X-ray source that during operation generates X-ray radiation at multiple X-ray focal spots, wherein in each case a collimator is allocated to each X-ray focal spot and the collimator selects the X-ray radiation that is generated by the respective X-ray focal spot and that is oriented toward a common detector, and wherein the collimators are arranged preferably fixed in relation to their in each case allocated X-ray focal spot.

An X-ray imaging system is known from the publication US 2011/0 075 802 A1 that has an X-ray source having an electron field emission source that emits an X-ray beam that impinges on an elongated, stationary anode in an evacuated housing. A magnetic deflecting system deflects the electron beam between the electron field emission source and the anode with the result that the electron beam can impinge on the anode at different sites whereby X-rays are thus emitted from these different sites in that the degree of the magnetic deflection is controlled.

SUMMARY

One or more example embodiments of the present invention provides an X-ray tube, an X-ray source and an X-ray facility in which the X-ray tubes are more compact.

BRIEF DESCRIPTION OF THE DRAWINGS

The invention is further described and explained hereinunder with the aid of the exemplary embodiments that are illustrated in the figures. Fundamentally, in the following description of the figures structures and units that remain essentially identical are provided with the same reference characters as in the first instance of the respective structure or unit.

In the drawings.

DETAILED DESCRIPTION

Figure 1:
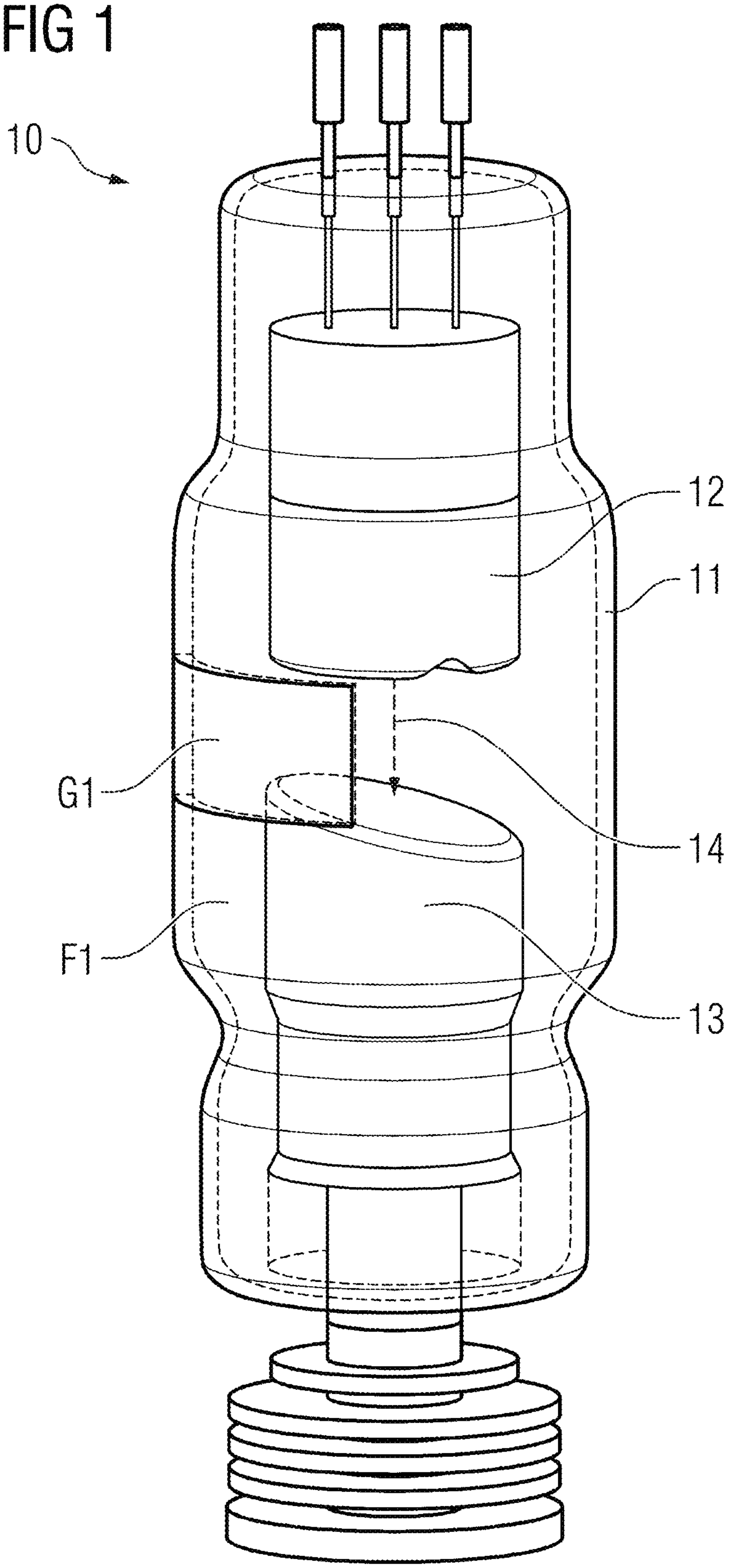
FIG. 1 shows an X-ray tube.

The X-ray tube in accordance with one or more example embodiments of the present invention has

- a vacuum housing having at least one side surface, wherein the vacuum housing comprises a cathode and an anode for generating X-rays, wherein an acceleration path for emitted electrons is provided between the cathode and the anode via a high voltage that can be applied, wherein a first of the at least one side surface has a first electrically conductive housing section having a temperature dependent electrical conductivity so that an essentially linear potential curve is set along the acceleration path.

The first electrically conductive housing section typically causes a current to flow via this housing section as a high voltage is being applied. As a consequence, advantageously an essentially linear potential curve sets itself along the first electrically conductive housing section and/or along the acceleration path. It is preferred that the essentially linear potential curve sets itself within the entire electron beam trajectory volume. In particular, scattered electrons can preferably be derived via the first electrically conductive housing section and can consequently reduce or prevent electrical charges. A further advantage relates accordingly to the reduction of leakage paths and/or shielding facilities for electrical charging in the first electrically conductive housing section.

One advantage of the X-ray tube is that in comparison to a conventional vacuum housing it is not necessary for at least one side surface to be made from (highly) insulating components in order to insulate the high voltage between one of the high voltage contacts and the housing. Due to the fact that the at least one side surface has a first electrically conductive housing section, it is preferred that conventional insulation measures such as for example a corresponding insulation spacing can be weakened or entirely replaced. The X-ray tube having the first electrically conductive housing section furthermore advantageously renders it possible for the anode and/or the cathode to be arranged altogether closer to the vacuum housing.

The operation of the X-ray tube depends typically on complying with regulatory standards and/or specifications of the legislator and/or manufacturer of the X-ray tube. Such standards and/or specifications relate in particular to a safe operation of the X-ray tube in order to minimise the risk for a user of the X-ray tube and/or for a patient. In this regard, in particular in general known standards are used for the insulation of components that conduct high voltage. This aspect consequently relates in particular to the feature in accordance with one or more example embodiments of the present invention whereby the first housing section is designed in an electrically conductive manner. As previously stated, the conductivity of the housing section depends inter alia on its temperature that can increase during operation in dependence upon the operating parameter.

Typically, the X-ray tube is designed for an imaging examination of a patient. Alternatively, the X-ray tube can be provided for a material inspection. The imaging examination can be in particular an angiography, computer tomography, mammography or radiography.

The cathode is in particular arranged within the vacuum housing and/or can be at high voltage potential. The cathode typically comprises an electron emitter. The electron emitter is designed so as to generate a (primary) focal point on the anode via electrons. The electron emitter can have a field effect emitter or a thermionic emitter. The thermionic emitter can be a spiral emitter or flat emitter.

The electron emission in the case of the field effect emitter is typically obtained by the application of a gate voltage, which due to the electrical fields that occur in the tips of the nanotubes, extracts the electrons from these nanotubes whereby the electron flow is formed. In addition to switching via the gate voltage, it is possible to block a generated electron flow via a blocking grid. The field effect emitter typically has a plurality of nanotubes, for example of carbon or silicon or molybdenum.

The emitted electrons are accelerated by the electron emitter in the direction of the anode along the acceleration path and generate the X-ray radiation during the interaction in the focal spot. The generated X-ray radiation usually has a maximum energy of up to 150 keV in dependence upon the acceleration voltage that is applied between the electron emitter and the anode. The acceleration voltage typically corresponds in the case of a unipolar X-ray tube to the high voltage and in the case of a bipolar X-ray tube regularly corresponds to double the magnitude of the high voltage. The emitted X-rays are typically oriented toward an examination region, for example having the patient or the material.

The anode is in particular arranged within the vacuum housing and/or can be at a high voltage potential that differs from the potential of the cathode. The anode can be designed as a rotary anode or stationary anode. The anode usually has an electrically conductive material such as for example molybdenum, graphite and/or tungsten. The anode consequently typically has a single electrical potential that is uniformly distributed over the anode. Fundamentally, it is feasible that the anode is made from the electrically conductive material. X-ray generating material such as for example tungsten and/or rhenium is preferably only used in the anode in order to reduce the proportion of extra focal X-ray radiation.

The acceleration path extends in particular in the vacuum between the cathode and the anode. The central beam of the emitted electrons propagates in particular along the acceleration path. The acceleration path is in particular a straight line, can alternatively be curved via a deflecting unit.

The high voltage is in particular a direct current and/or is for example between 20 and 200 kV, in particular more than 40 kV and/or less than 150 kV. The high voltage is used in particular to accelerate the electrons within the X-ray tube along the acceleration path.

A high voltage supply in particular has a high voltage generator that is arranged in particular outside of the vacuum housing. The high voltage generator in particular provides the high voltage at an output in dependence upon a low voltage or mains voltage that is applied at an input. For this purpose, the high voltage generator can comprise a transformer and/or a rectifier.

The high voltage supply typically decreases the high voltage that is provided at the output and conducts the decreased high voltage into a high voltage supply. The high voltage supply can comprise a high voltage cable and/or a board. The high voltage supply can be designed as electrically insulated, for example by a corresponding shielding of the part that conducts the high voltage.

An evacuated region between the acceleration path and the first electrically conductive housing section in particular has an insulation path to a part typically of less than 100%, in particular if the insulation path is evaluated independent of the design of the first electrically conductive housing section. The evacuated region has in particular a sufficient dielectric strength because the essentially linear potential curve is set along the acceleration path.

A spacing between the first electrically conductive housing section and the acceleration path or the anode or cathode is typically smaller than a provision of an insulation path, which complies with regulation, in particular if the insulation path is evaluated independent of the design of the first electrically conductive housing section. That means in particular that an insulation capability of the vacuum between the first electrically conductive housing section and the acceleration path or the cathode or the anode is too small in order to ensure the insulation is taken into consideration in compliance with regulation during operation of the X-ray tube if the technical effect of the first electrically conductive housing section is not considered. The insulation with respect to the high voltage is advantageously at least in part assumed by the linear potential curve along the first electrically conductive housing section or along the acceleration path with the result that the operation of the X-ray tube complies with regulation.

The vacuum housing has at least one side surface. The vacuum housing forms in particular a container in which the cathode and the anode can be contained. The at least one side surface spatially surrounds in particular the vacuum and/or the acceleration path. The vacuum housing can be surrounded at least in part by a cooling medium.

The vacuum housing can typically have multiple side surfaces. A part of the side surfaces can be designed as fixedly connected to one another and/or as a single piece. Apart from that, the term side surface includes in this case in particular expressly an upper side and/or a lower side of the vacuum housing. In other words, with side surface any side of the vacuum housing is intended independent of the orientation of the vacuum housing.

It is conceivable that a side surface has multiple housing sections that are identical or differ with regard to their material composition and/or surface composition. The side surface can fundamentally be made from an electrically conductive housing section or such a frame. The frame can be made for example from an electrically insulating material.

A second side surface of the vacuum housing can have a second electrically conductive housing section. The second electrically conductive housing section can be designed in such a manner that this housing section has the same electrical conductivity as the first electrically conductive housing section. The first electrically conductive housing section and the second electrically conductive housing section are typically arranged on opposite-lying sides of the vacuum housing. Remaining side surfaces of the vacuum housing can be designed in particular as electrically insulating. An X-ray emission window is usually integrated into a side surface of the vacuum housing.

The first electrically conductive housing section has a temperature dependent electrical conductivity that depends in particular on the material or the material composition of the housing section and regularly on the temperature. In general, materials can differ in dependence upon their respective electrical conductivity and can be divided roughly into the classes insulators (non-conductors), semiconductors, conductors or superconductors. A transition between the classes is typically fluid. The material and/or the material composition of the first electrically conductive housing section can be insulating in particular at a first temperature, "less" conductive at a higher temperature and "normally" conductive at another higher temperature. The first electrically conductive housing section preferably has an expansion parallel to the acceleration path that corresponds at least to the length of the acceleration path.

The first electrically conductive housing section is in particular designed as passively electrically conductive. In other words, it is possible for the first electrically conductive housing section to not be electrically connected to a current source and/or voltage source. In particular, a voltage drop across the first electrically conductive housing section can be changed during operation for example by a variation of the high voltage.

The first electrically conductive housing section is in particular not perfectly insulating or poorly conductive at the operating temperature. The material or the material composition of the housing section can be allocated to the definitions in https://de.wikipedia.org/wiki/Elektrische_Leitfähigkeit of the class insulator or non-conductor, preferably however in particular to one of the classes semi-conductor, conductor or super conductor. Typically, the first electrically conductive housing section can be designed in such a manner that the electrical conductivity at a lower temperature threshold value is at least 10^−8 S/m and/or at an upper temperature threshold value is at most 10^−4 S/m. In accordance with Wikipedia, the first electrically conductive housing section is not a so-called good insulator. A current flow along the first electrically conductive housing section is in particular deliberately permitted, preferably desired from a minimum amplitude value and/or up to a maximum amplitude value. The amount of charge that is discharged via the first electrically conductive housing section is discharged in particular to a ground connection and/or to a protective conductor. The first electrically conductive housing section typically acts as a capacitor and/or the charge quantity is conducted away through the first electrically conductive housing section or on its surface, for example in the direction of the cathode or a cathode part that lies a short distance away from this housing section. The electrical current, in other words, the charge quantity, flows for example through the electrically insulating cooling medium and/or to a second electrically conductive housing section. The first electrically conductive housing section typically does not act as a frame electrode or focusing electrode with which the emitted electrons are blocked or deflected or can be focused.

The lower temperature threshold value is for example at least −50° C., preferably more than 0° C. The upper temperature threshold value is in particular maximum 500° C., preferably less than 100° C. The operating temperature is in particular between the lower temperature threshold value and the upper temperature threshold value. The operating temperature can correspond in particular to a room temperature or to a temperature window of 5° C. as a lower temperature threshold value up to 25° C. as an upper temperature threshold value, preferably 20° to 25° in accordance with the information in Wikipedia. The material or the material composition has in particular a breakdown voltage that is higher than the high voltage.

One embodiment provides that the first electrically conductive housing section is designed as annular and surrounds the acceleration path as a ring. The first electrically conductive housing section can be in particular symmetrical. Advantageously, in this exemplary embodiment a spacing between the first electrically conductive housing section and the acceleration path can be smaller than an insulation path that is provided in compliance with regulation.

One embodiment provides that a shape of the first electrically conductive housing section has at least one corner at the height of the acceleration path. This embodiment means that advantageously a corner that is to be avoided in order to comply with regulation and/or for development reasons, which rises as a peak from its surroundings and thus can be particularly attractive for a high voltage breakdown can be provided in the X-ray tube in accordance with one or more example embodiments of the present invention because the essentially linear potential curve is set along the acceleration path.

One embodiment provides that the shape is rectangular or trapezoidal. One such shape is in particular advantageous because in comparison to conventionally round shapes it is possible to realise new structural shapes without impairing the electrical insulation capability of the X-ray tube.

One embodiment provides that the first electrically conductive housing section connects the cathode and the anode in an electrically conductive manner. The first electrically conductive housing section is in particular electrically conductively connected to an electrical contact of the cathode and an electrical contact of the anode. The electrically conductive connection is provided essentially by the first electrically conductive housing section and/or on an edge via an anode side cable connection between the electrically conductive housing section and the electrical contact of the anode and/or on the edge side via a cathode side cable connection between the electrically conductive housing section and the electrical contact of the anode. The electrical contact of the cathode can be the cathode-side high voltage supply, in particular the cathode-side feedthrough through the vacuum housing. The electrical contact of the anode can be the anode-side high voltage supply, in particular the anode-side feedthrough through the vacuum housing. In particular, the high voltage that can be applied along the acceleration path drops across the first electrically conductive housing section. The current that flows via the first electrically conductive housing section is in particular determined by the magnitude of the high voltage. This embodiment renders possible in particular a more homogeneous linear potential curve along the acceleration path.

One embodiment provides that the vacuum housing is made from the first electrically conductive housing section. This embodiment is in particular compatible with the previous embodiment or a development of the same. The first electrically conductive housing section is preferably thus arranged along the entire shell surface of the vacuum housing. In other words, the vacuum housing does not have a side surface having a housing section without the temperature dependent electrical conductivity. The shell of the vacuum housing corresponds in particular to a wall of the vacuum housing. Essentially this means in particular that an X-ray emission window can be provided with a conductivity as part of the vacuum housing, which is different to the electrical conductivity and/or that the cathode side feedthrough and/or the anode side feedthrough can penetrate the vacuum housing in a vacuum sealed manner. One advantage of this embodiment is that the linearity of the potential curve is improved along the acceleration path.

One embodiment provides that the first electrically conductive housing section has flint glass, proceram, silicon nitride, silicon carbide, zirconium oxide, silicon and/or a doped material. It is fundamentally feasible that the first electrically conductive housing section only has one of the above-mentioned electrically conductive materials or a combination of the above-mentioned electrically conductive materials in a material composition. The material composition can comprise various layers having one or multiple of the above-mentioned electrically conductive materials. It is feasible that one of the layers is designed as a carrier layer and/or another layer is designed as a coating. In particular, the coating can comprise one of the above-mentioned electrically conductive materials. The material composition can fundamentally comprise further materials, typically insulating materials such as glass, plastic, etc. that are used for example as a carrier layer. As an alternative to the layered structure, the material composition can be in a mixed form, for example in a solidified powder.

One embodiment provides that the first electrically conductive housing section is designed as multi-layered, wherein a layer that is oriented toward the vacuum is designed as electrically conductive, wherein a layer that is oriented outward is designed as electrically conductive and wherein a layer that lies in between is designed as electrically insulating. The layer that is oriented toward the vacuum can be named the first layer, the layer that lies in between can be named the second layer and the layer that is oriented outward can be named the third layer. Between the first layer and the third layer it is fundamentally possible to provide a further layer. The first layer and the third layer preferably have the same material composition or the same material that are described in connection with the previous embodiment. The second layer can be designed from an electrically insulating glass or an electrically insulating ceramic. The first layer and/or the third layer can be designed in particular as a coating.

One embodiment provides that the X-ray tube moreover has a control unit and a switching facility, wherein the control unit has an interface for receiving a measured value that maps the electrical conductivity of the first electrically conductive housing section and for comparing the measured value with a threshold value, wherein the switching facility is designed so as to shut down the high voltage in dependence upon the comparison result.

The control unit can receive and in particular process the measured value. The processing comprises for example comparing the measured value with the threshold value. The processing, in particular the comparison, of the measured value can be performed in accordance with program code means. The control unit can have a computing or logic module for executing the program code means and/or a storage unit for storing and/or for providing the threshold value. As the measured value is compared with the threshold value, in particular the comparison result is calculated or determined. The control unit can receive the usually time-resolved measured value in a clocked and/or repeated manner and/or compare it with the threshold value. The threshold value is usually constant. Fundamentally, it is feasible that the threshold value is not constant but rather can change, in particular in dependence upon future planned operating times and/or operating parameters of the X-ray tube.

The comparison result indicates in particular to what extent the operation of the X-ray tube can be continued or whether the disconnection has to take place. It is conceivable that the comparison result indicates that the shutdown is maintained. The comparison result can additionally typically indicate that the high voltage is switched on. In this case, the switching facility is designed so as to switch on the high voltage in dependence upon the comparison result. The comparison result is in particular binary and/or usually time variable.

The switching facility can be connected to the high voltage supply so as to shut down and/or switch on the high voltage. The process of switching on the high voltage comprises in particular applying the high voltage. If the high voltage is shut down, in particular a high voltage is not applied. Alternatively or in addition thereto, the switching facility can comprise one or multiple switches that after the shutdown interrupt the conduction of the high voltage in the individual high voltage supply and/or that after switching on the high voltage conduct the high voltage in the high voltage supply. A further alternative relates to the possibility that in the case of the shutdown, the high voltage generator is shut down and/or in the case of switching on, the high voltage generator is switched on.

One embodiment provides that the X-ray tube moreover has a temperature sensor for measuring a temperature value as a measured value that maps the electrical conductivity of the first electrically conductive housing section. In particular, a cooling apparatus is designed so as to control the temperature of the X-ray tube in dependence upon the temperature value. This embodiment renders it possible in particular to directly control the temperature.

One embodiment provides that the X-ray tube moreover has a current sensor for measuring a current value as a measured value that flows via the first electrically conductive housing section. The measurement can be performed in particular by virtue of the fact that a current between the cathode and the anode and/or a current between the anode to ground and/or a current between the cathode to ground is measured, which regularly map the sum over all the current paths. It is preferred that the current value can be derived or determined therefrom. In particular, the cooling apparatus is designed so as to control the temperature of the cooling medium in dependence upon the current value. The current value forms in particular the current that is flowing via the first electrically conductive housing section. In the case of this embodiment, the upper temperature threshold value and/or the lower temperature threshold value can be allocated to or can essentially correspond to an upper current threshold value or a lower current threshold value. The allocation of the threshold values can be performed in an allocation table that is stored for example in the storage unit.

One embodiment provides that the temperature of the X-ray tube can be controlled via a cooling apparatus, wherein the cooling apparatus is designed so as to control the temperature of the first electrically conductive housing section above a lower temperature threshold value and/or below an upper temperature threshold value. In particular the temperature dependent electrical conductivity is controlled by controlling the temperature of the X-ray tube, in particular the first electrically conductive housing section. The cooling apparatus has in particular the cooling medium that can be in particular electrically insulating. The cooling medium is in particular a fluid, in particular liquid and/or gaseous. The cooling medium is preferably arranged outside of the vacuum housing, fundamentally can additionally flow around the vacuum housing. The vacuum housing can be designed in particular in a fluid-tight manner.

The control of the temperature dependent electrical conductivity comprises in particular stabilizing and/or limiting and/or establishing the current that drops across the first electrically conductive housing section. The controlling of the temperature of the first electrically conductive housing section advantageously renders it possible that during operation of the multi-tube X-ray emitter housing the essentially linear potential curve is maintained along the first electrically conductive housing section.

The cooling apparatus can be designed as active or passive. One example of the passive embodiment is for example a corresponding dimensioning or shape of the surface of the vacuum housing, in particular a side surface. The shape of the surface can comprise a structure that enlarges the surface. One example of the active embodiment is that the cooling apparatus has a fluid cooling medium heat exchanger and/or an enforced convection. The controlling of the temperature of the X-ray tube comprises in particular setting preferably an increase and/or a decrease of the temperature of a cooling medium. The active cooling apparatus in particular sets the temperature of the cooling medium in such a manner that the temperature at the first electrically conductive housing section is above the lower temperature threshold value and/or below the upper temperature threshold value. The lower temperature threshold value and the upper temperature threshold value form in particular a temperature interval in which the operating temperature of the first electrically conductive housing section preferably lies. The upper temperature threshold value and/or the lower temperature threshold value can be stored in particular in the storage unit. The cooling apparatus can preferably access the stored upper temperature threshold and/or lower temperature threshold via an interface.

One embodiment provides that the cooling apparatus is designed so as to control the temperature of the cooling medium that is located outside of the vacuum housing and directly interacts with the first electrically conductive housing section. This embodiment is in particular advantageous because in this case the temperature control occurs closer to or directly on the first electrically conductive housing section and consequently preferably more rapidly and/or precisely.

An X-ray source in accordance with one or more example embodiments of the present invention has an X-ray emitter housing, an X-ray tube as claimed in one of the preceding claims, which is arranged within the X-ray emitter housing, a high voltage supply for providing the high voltage and a cooling apparatus.

The X-ray source in accordance with one or more example embodiments of the present invention has the X-ray tube and consequently shares the above-described advantages and embodiments of the same.

The X-ray emitter housing fundamentally can be filled entirely with the cooling medium. In this case, the X-ray emitter housing typically has an expansion compensating container and/or a pressure valve. The X-ray emitter housing typically has an X-ray emission window.

One embodiment provides that the X-ray source has a further X-ray tube and wherein a spacing between the X-ray tube and the further X-ray tube is smaller than an insulation path between the two X-ray tubes.

The two X-ray tubes can typically be controlled in such a manner that they can simultaneously or consecutively emit X-rays. A sequence of the X-ray emission can comprise that the two X-ray tubes emit X-rays simultaneously during a transition time that is shorter than the time of the X-ray emission for each X-ray tube. Control methods of the two X-ray tubes render possible in particular an imaging examination, for example comprising a two-dimensional fluoroscopy, a tomosynthesis or a projection-based three-dimensional volume reconstruction.

The two X-ray tubes are advantageously structurally identical. Owing to the higher quantities, there can typically be a price advantage. In addition, the structurally identical nature renders it possible that fewer different components are integrated into the multi-tube X-ray emitter housing, which can simplify inter alia maintenance. Alternatively, fundamentally an X-ray tube can differ from another X-ray tube in particular with regard to the embodiment of the anode and/or cathode.

An X-ray facility in accordance with one or more example embodiments of the present invention has an X-ray source and an X-ray detector.

The X-ray facility in accordance with one or more example embodiments of the present invention has the X-ray tube and consequently shares the above-described advantages and embodiments of the same.

The X-ray detector is designed so as to detect the X-ray radiation that propagates through the examination region. During the detection, in particular an attenuation profile is acquired. The detected X-ray radiation can be used in a reconstruction computer, for example in accordance with the imaging examination in order to reconstruct a 2D or 3D image. Fundamentally, sequences of images over the time can also be reconstructed.

In the case of the features that are mentioned in the description of the apparatus, advantages or alternative embodiments are likewise to be transferred to a method and vice versa. In other words, claims can be developed with features of the apparatus. In particular, the apparatus in accordance with one or more example embodiments of the present invention can be used in the method.

FIG. 1 illustrates an X-ray tube 10 in a side view.

The X-ray tube 10 has a vacuum housing 11. The vacuum housing 11 comprises at least one side surface F1 . . . FN. The vacuum housing 11 moreover comprises a cathode 12 and an anode 13 for generating X-rays.

An acceleration path 14 for emitted electrons is provided between the cathode 12 and the anode 13 via a high voltage that can be applied. The acceleration path 14 for the emitted electrons is illustrated in FIG. 1 as a dashed arrow. The electron beam trajectory volume is limited upward or downward by the cathode 12 and the anode 13.

A first of the at least one side surface F1 has a first electrically conductive housing section G1 having a temperature dependent electrical conductivity so that an essentially linear potential curve is set along the acceleration path 14. The electrical conductivity at a lower temperature threshold value is preferably at least 10^−8 S/m and/or at an upper temperature threshold value at most 10^−4 S/m. The first electrically conductive housing section G1 preferably has flint glass, proceram, silicon nitride, silicon carbide, zirconium oxide, silicon and/or a doped material.

Figure 2:
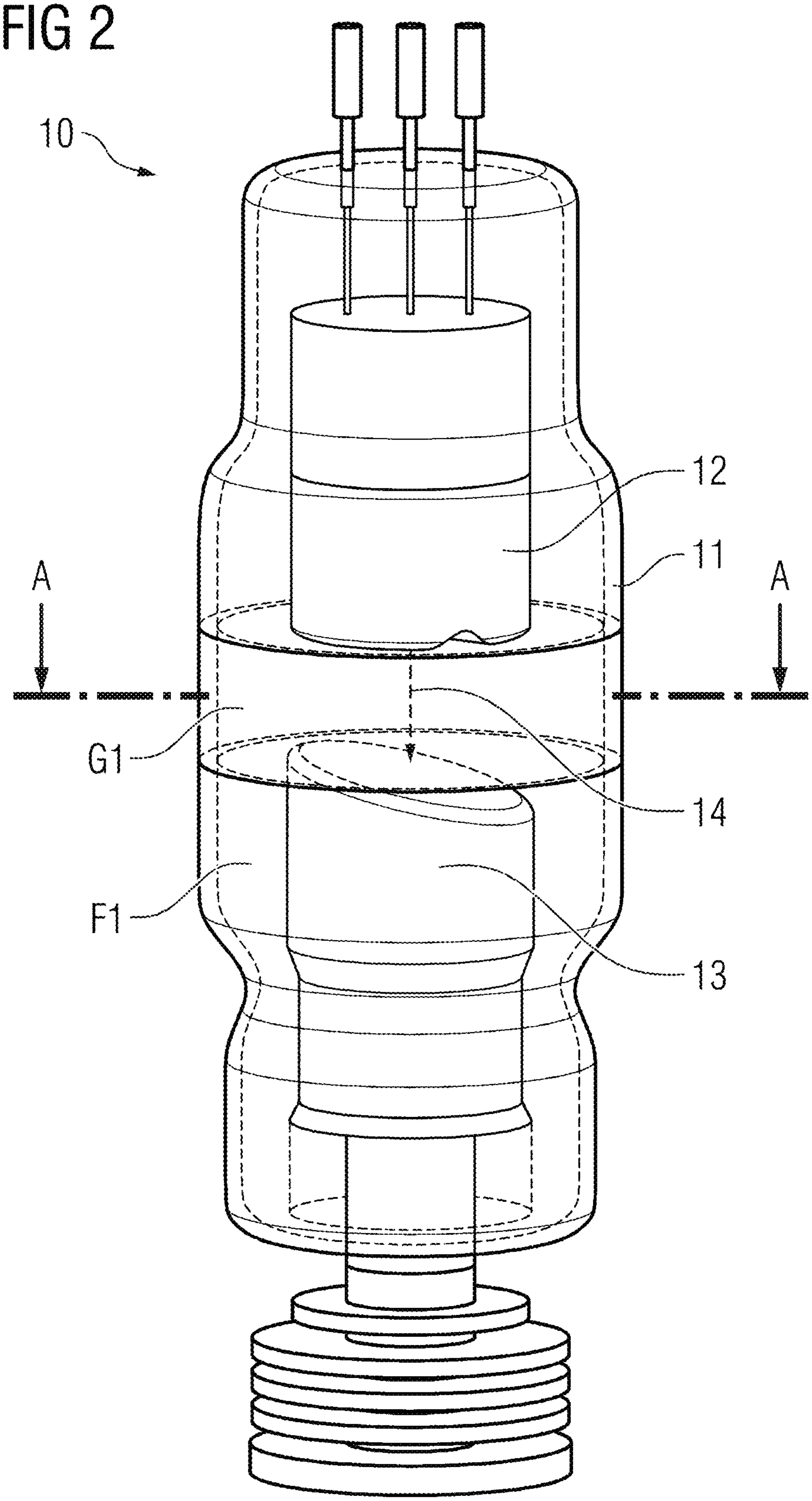
FIG. 2 shows an X-ray tube in a first exemplary embodiment.

FIG. 2 illustrates a first exemplary embodiment of the X-ray tube 10 in a side view.

The first electrically conductive housing section G1 is designed as annular and surrounds the acceleration path 14 as a ring.

Figure 3:
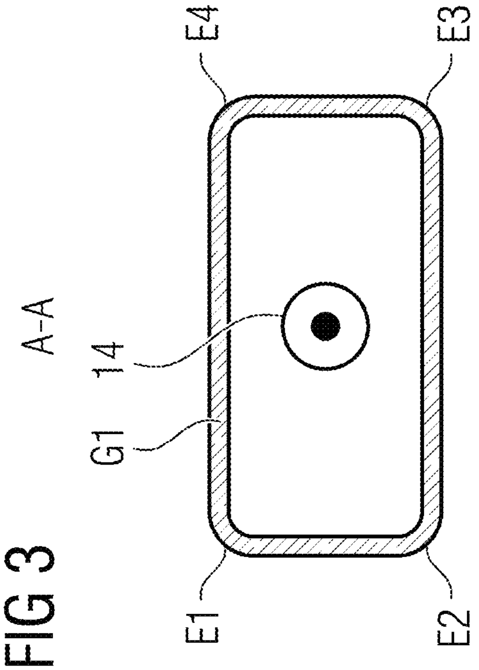
FIG. 3 shows an X-ray tube in a second exemplary embodiment.

FIG. 3 illustrates a second exemplary embodiment of the X-ray tube 10 in a cross-sectional view perpendicular to the acceleration path 14.

In comparison to the round shape in the exemplary embodiment of FIG. 2, a shape of the first electrically conductive housing section G1 at the height of the acceleration path 14 has at least one corner. In FIG. 3, the shape is rectangular.

Figure 4:
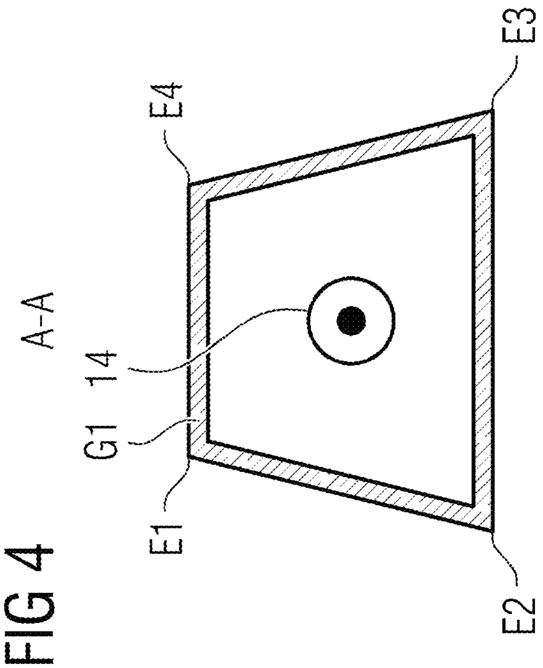
FIG. 4 shows an X-ray tube in a third exemplary embodiment.

FIG. 4 illustrates a third exemplary embodiment of the X-ray tube 10 in a cross-sectional view perpendicular to the acceleration path 14.

In comparison to the round shape in the exemplary embodiment of FIG. 2, a shape of the first electrically conductive housing section G1 at the height of the acceleration path 14 has at least one corner. In FIG. 4, the shape is trapezoidal.

Figure 5:
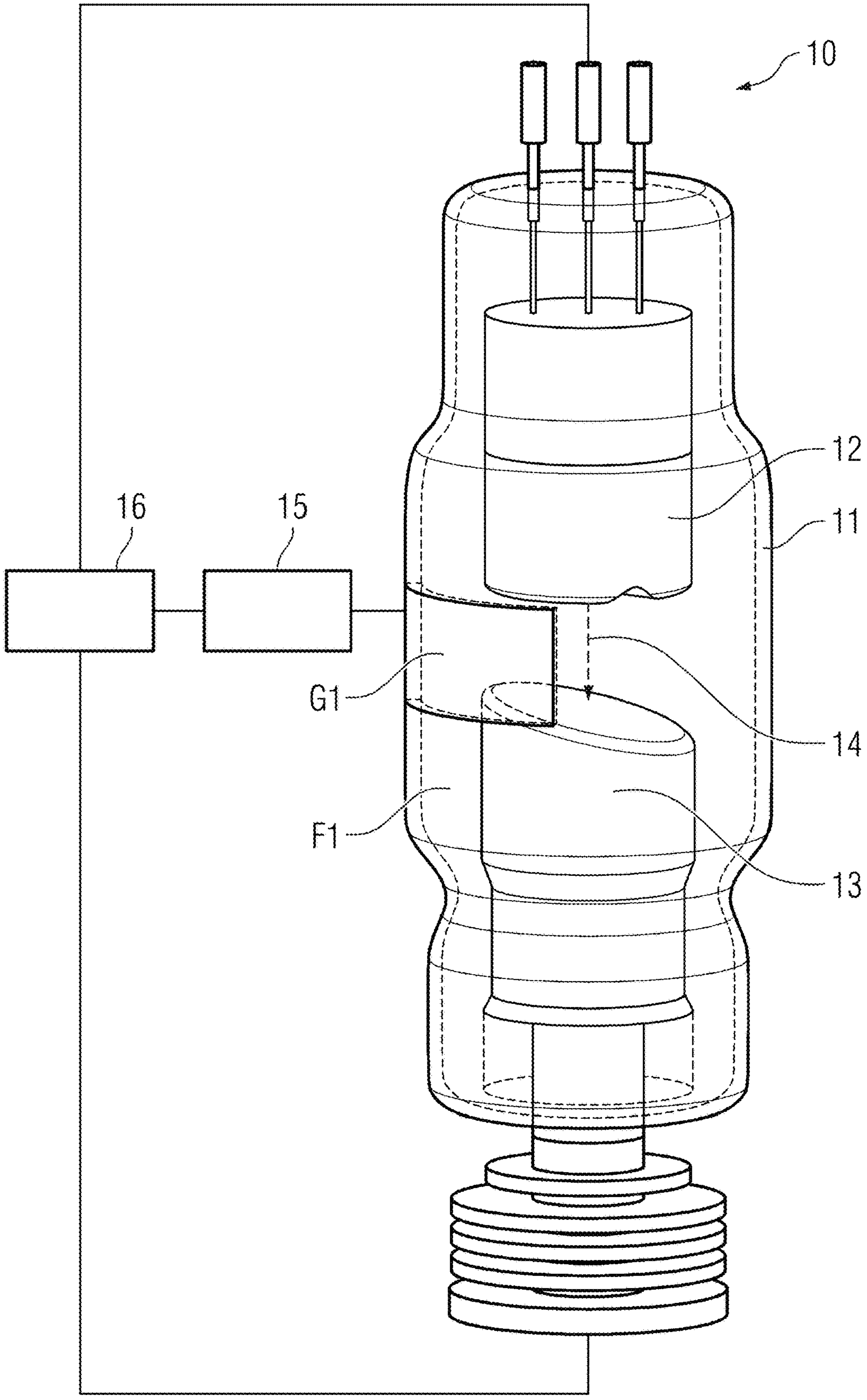
FIG. 5 shows an X-ray tube in a fourth exemplary embodiment.

FIG. 5 illustrates a fourth exemplary embodiment of the X-ray tube 10 in a side view.

The X-ray tube 10 has a control unit 15 and a switching facility 16. The control unit 15 has an interface for receiving a measured value that maps the electrical conductivity of the first electrically conductive housing section G1 and the interface is designed so as to compare the measured value with a threshold value. The switching facility 16 is designed so as to switch on the high voltage in dependence upon the comparison result.

The X-ray tube 10 can have a temperature sensor for measuring a temperature value as a measured value that maps the electrical conductivity of the first electrically conductive housing section G1 and/or a current sensor for measuring a current value as a measured value that flows via the first electrically conductive housing section G1.

Figure 6:
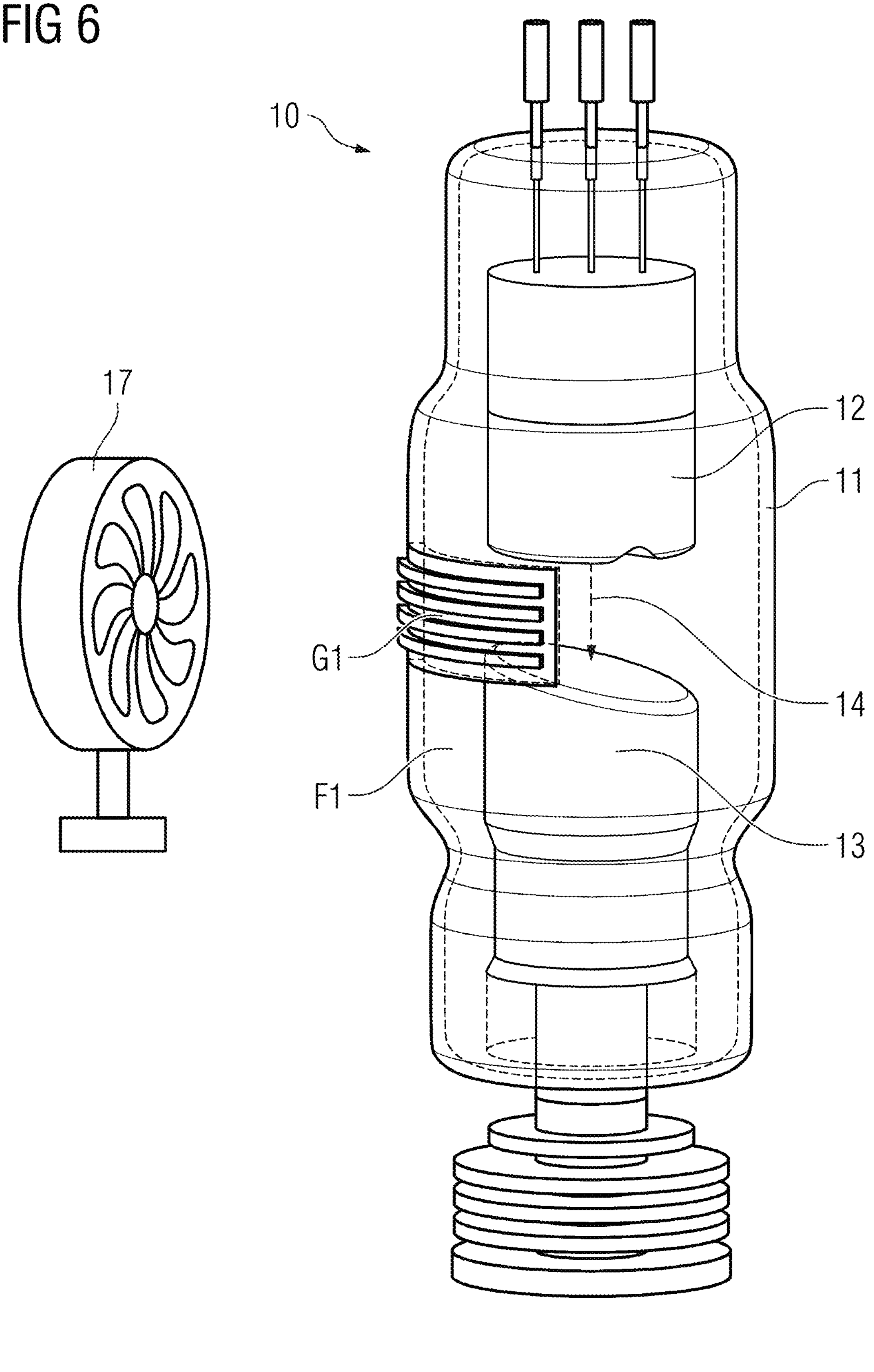
FIG. 6 shows an X-ray tube in a fifth exemplary embodiment.

FIG. 6 illustrates a fifth exemplary embodiment of the X-ray tube 10 in a side view.

The temperature of the X-ray tube 10 is controlled via a cooling apparatus 17. The cooling apparatus 17 is designed so as to control the temperature of the first electrically conductive housing section G1 above a lower temperature threshold value and/or below an upper temperature threshold value. The cooling apparatus 17 is designed in particular so as to control the temperature of the cooling medium that is located outside of the vacuum housing 11 and directly interacts with the first electrically conductive housing section G1. The cooling medium is in particular a fluid.

FIG. 6 illustrates the cooling apparatus 17 in an exemplary manner as a fan. The cooling apparatus 17 can cool however additionally as is illustrated in FIG. 6 or alternatively in the form of a surface enlargement of the first electrically conductive housing section G1 and/or in the form of a cooling channel and/or in the form of an impingement cooling. Alternatively, the cooling apparatus 17 can be designed in a purely passive manner.

Figure 7:
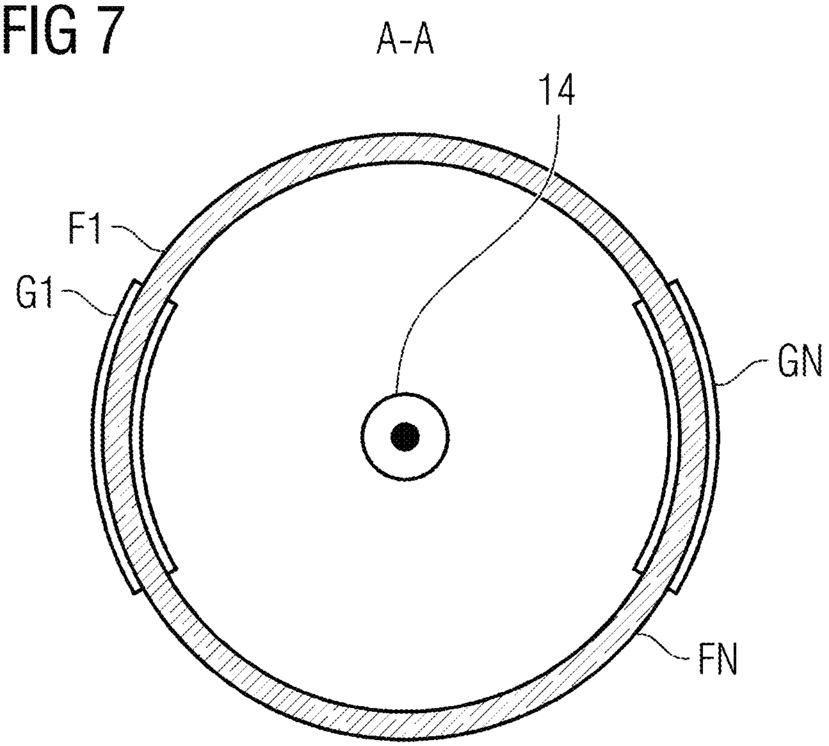
FIG. 7 shows an X-ray tube in a sixth exemplary embodiment.

FIG. 7 illustrates a sixth exemplary embodiment of the X-ray tube 10 in a detailed view. The vacuum housing 11 has a round shape at the height of the acceleration path 14. The first electrically conductive housing section G1 has a circular segment shape.

The first electrically conductive housing section G1 is designed as multi-layered. A layer that is oriented toward the vacuum is designed as electrically conductive. A layer that is oriented outward is designed as electrically conductive. A layer in between is designed as electrically insulating. The layer that lies in between can be made in particular of the material of the remaining side surfaces of the vacuum housing 11. The electrically conductive layers are designed as a coating.

The vacuum housing 11 has a further side surface FN. The further side surface FN has a second electrically conductive housing section G2 having a temperature dependent electrical conductivity.

Figure 8:
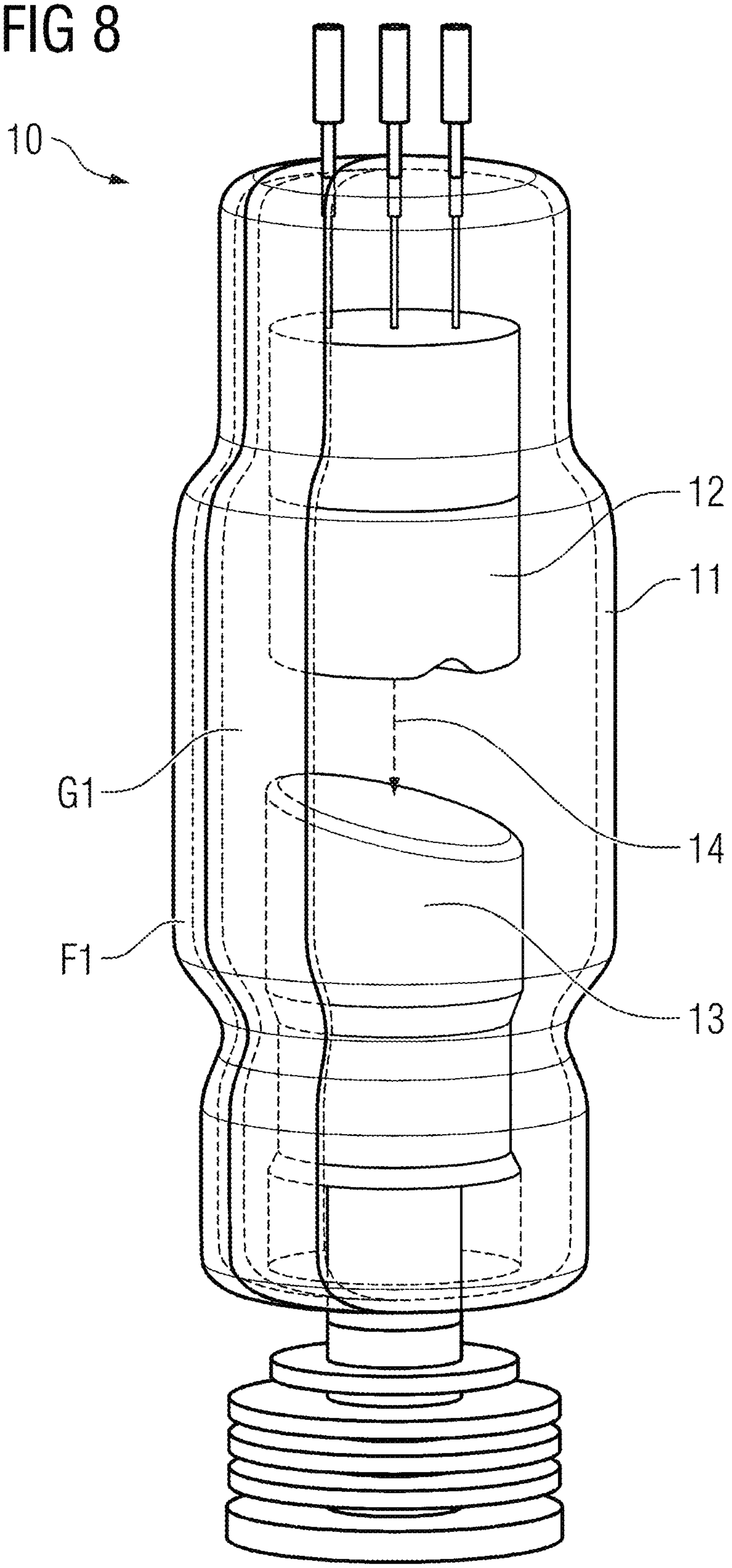
FIG. 8 shows an X-ray tube in a seventh exemplary embodiment.

FIG. 8 illustrates a seventh exemplary embodiment of the X-ray tube 10 in a side view. The first electrically conductive housing section G1 connects the cathode 12 and the anode 13 in an electrically conductive manner. The first electrically conductive housing section G1 consequently reaches from an electrical contact of the cathode 12 to an electrical contact of the anode 13.

Figure 9:
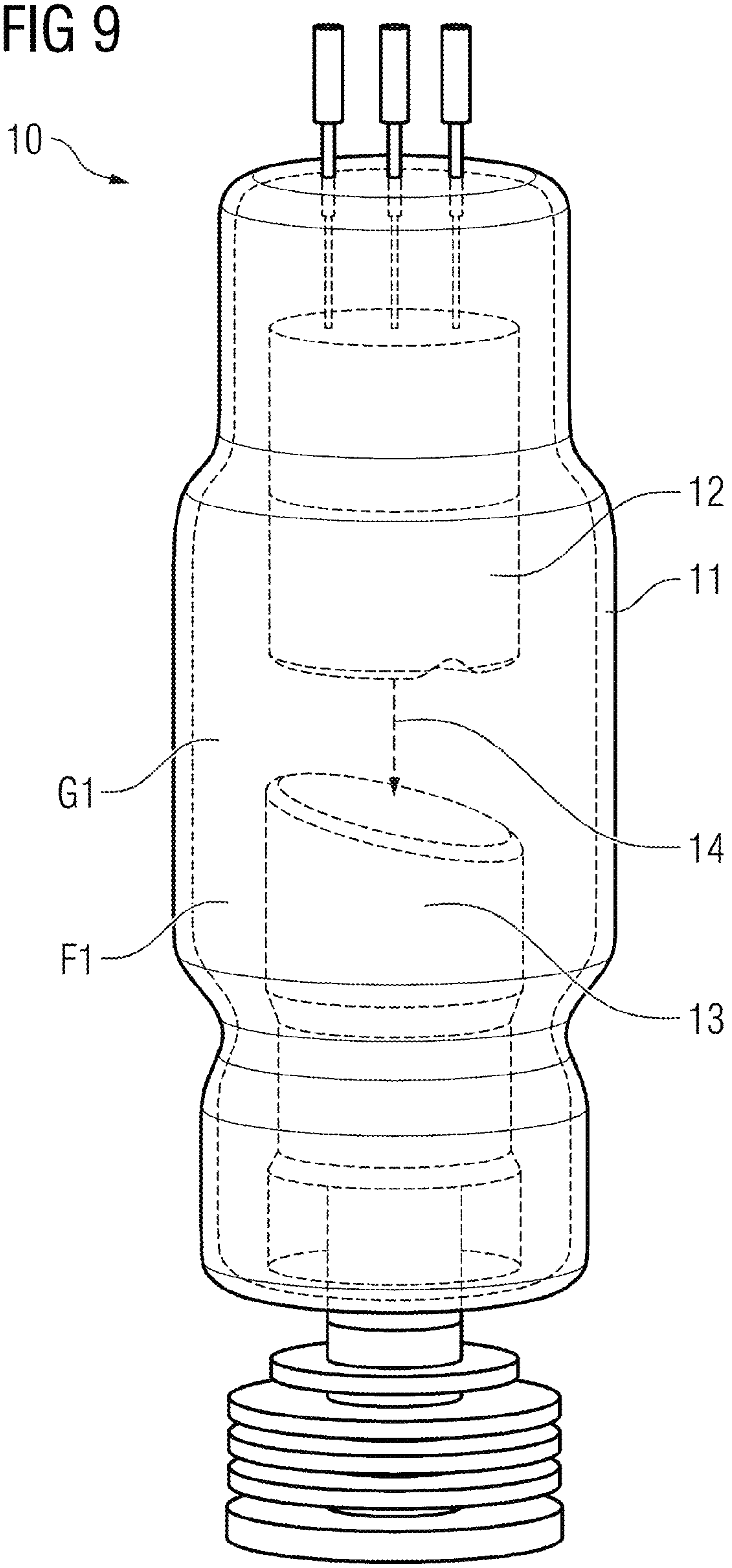
FIG. 9 shows an X-ray tube in an eighth exemplary embodiment.

FIG. 9 illustrates an eighth exemplary embodiment of the X-ray tube 10 in a side view. The vacuum housing 11 is made essentially from the first electrically conductive housing section G1. The first electrically conductive housing section G1 consequently forms the entire shell surface of the vacuum housing 11.

Figure 10:
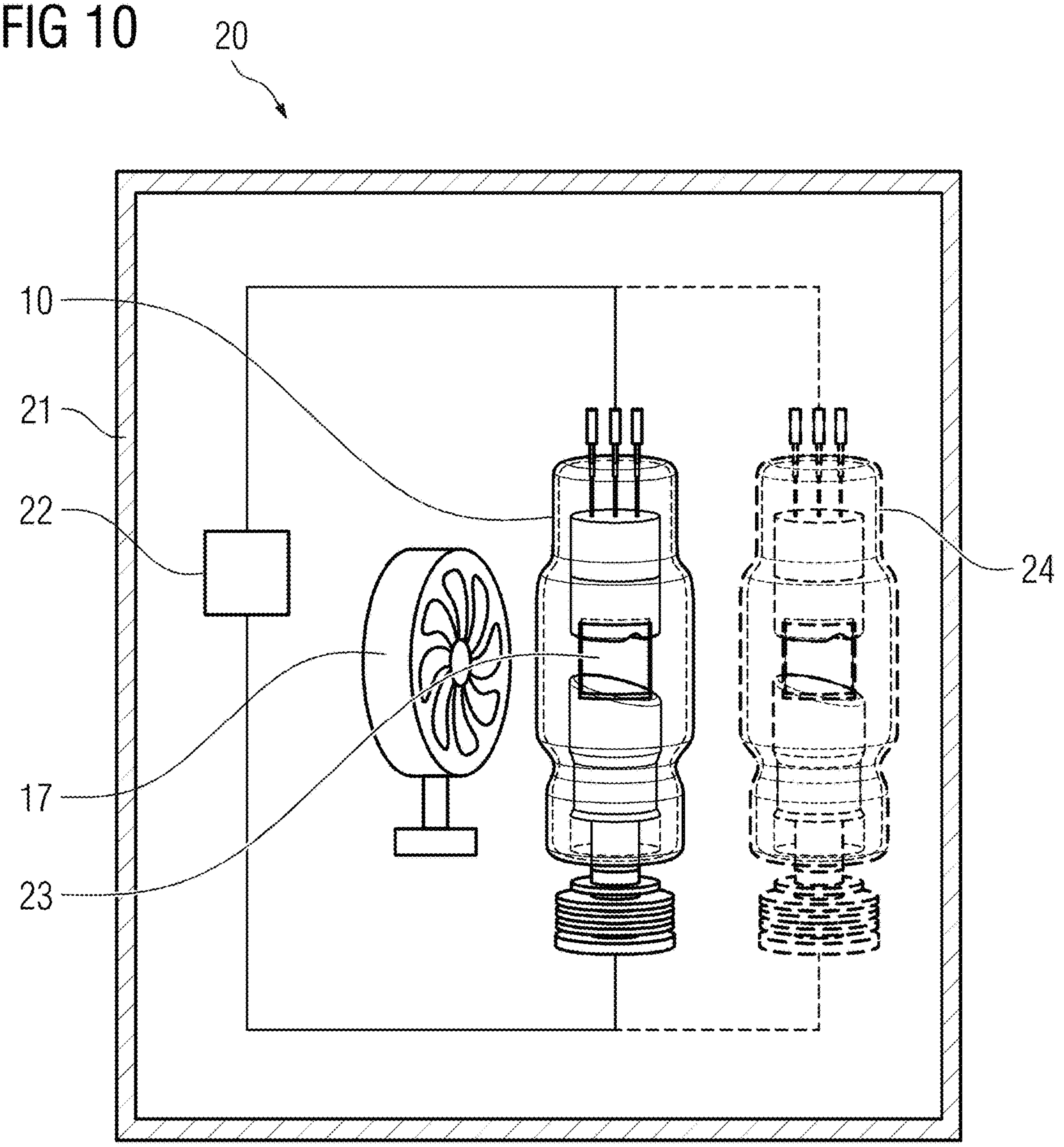
FIG. 10 shows an X-ray source according to an example embodiment.

FIG. 10 illustrates an X-ray source 20 in a schematic view.

The X-ray source 20 has an X-ray emitter housing 21, an X-ray tube 10 that is arranged within the X-ray emitter housing 21, a high voltage supply 22 and a cooling apparatus 17. An X-ray emission window 23 is integrated into the X-ray emitter housing 21.

FIG. 10 indicates with dashed lines that the X-ray source 20 has a further X-ray tube 24, wherein a spacing between the X-ray tube 10 and the further X-ray tube 24 is smaller than an insulation path between the two X-ray tubes 10, 24.

Figure 11:
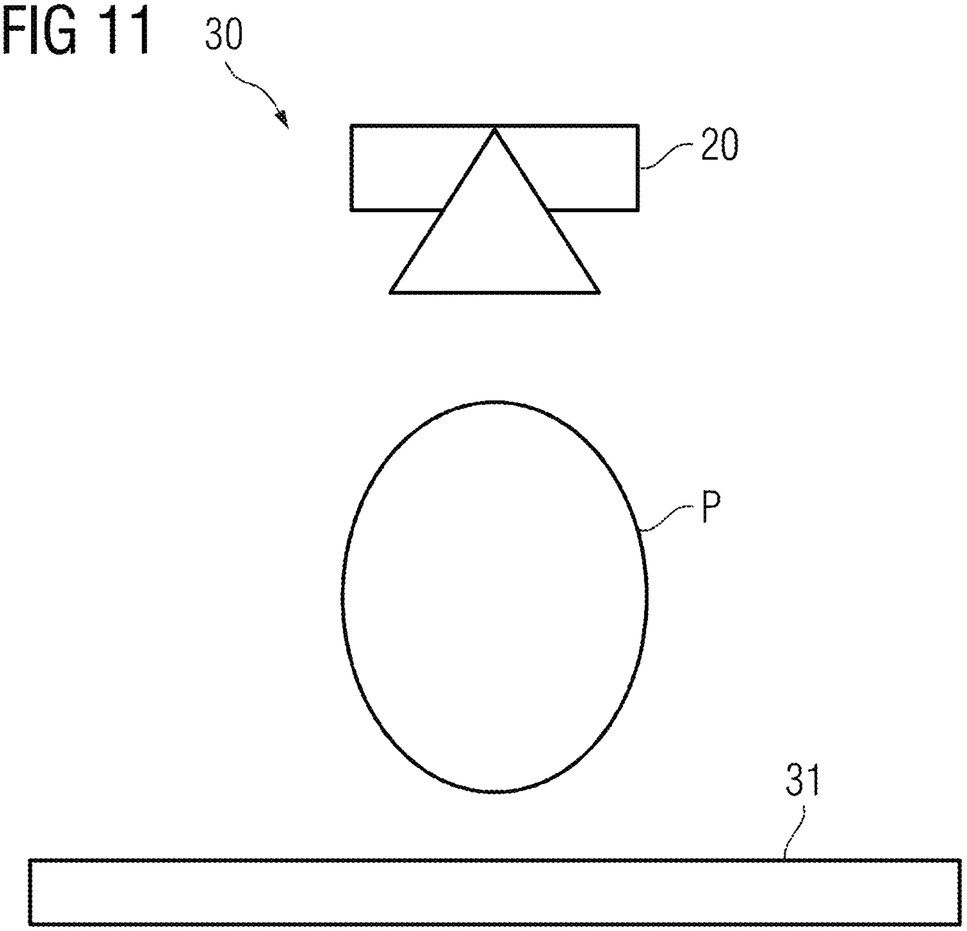
FIG. 11 shows an X-ray facility according to an example embodiment.

FIG. 11 illustrates an X-ray facility 30 in a schematic view.

The X-ray facility 30 has an X-ray source 20 and an X-ray detector 31. An examination object is arranged between the X-ray source 20 and the X-ray detector 31. In this case, the examination object is a patient P. The examination object is X-rayed during operation of the X-ray facility 30 using the X-rays that are generated and attenuation profiles that at least in part represent the examination object can be acquired at the X-ray detector 31.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been further illustrated and described in detail by the preferred exemplary embodiments, the invention is nevertheless not limited in this regard by the disclosed examples and other variations can be derived therefrom by the person skilled in the art without departing the scope of the invention.

The invention claimed is:

1. An X-ray tube comprising:
a vacuum housing with at least one side surface,
the vacuum housing including a cathode and an anode for generating X-rays,
wherein an acceleration path for emitted electrons is between the cathode and the anode via an applied high voltage, and
a first of the at least one side surface has a first electrically conductive housing section having a temperature dependent electrical conductivity such that an essentially linear potential curve is set along the acceleration path.

2. The X-ray tube of claim 1,
wherein the first electrically conductive housing section is annular and surrounds the acceleration path.

3. The X-ray tube of claim 1,
wherein the first electrically conductive housing section connects the cathode and the anode in an electrically conductive manner.

4. The X-ray tube of claim 1,
wherein the vacuum housing is essentially made from the first electrically conductive housing section.

5. The X-ray tube of claim 1,
wherein the electrical conductivity is at least one of (i) at a lower temperature threshold value is at least 10^−8 S/m or (ii) at an upper temperature threshold value is at most 10^−4 S/m.

6. The X-ray tube of claim 1,
wherein the first electrically conductive housing section has at least one of flint glass, proceram, silicon nitride, silicon carbide, zirconium oxide, silicon or a doped material.

7. The X-ray tube of claim 1, further comprising:
a control unit; and
a switching facility, wherein the control unit includes an interface configured to receive a measured value that maps the electrical conductivity of the first electrically conductive housing section and to compare the measured value with a threshold value, wherein the switching facility is configured to shut down the high voltage based on the comparison result.

8. The X-ray tube of claim 1, further comprising:

at least one of a temperature sensor configured to measure a temperature value as a measured value that maps the electrical conductivity of the first electrically conductive housing section, or a current sensor configured to measure a current value as a measured value that flows via the first electrically conductive housing section.

9. The X-ray tube of claim 1, wherein the temperature of the X-ray tube is controlled via a cooling apparatus, wherein the cooling apparatus is configured to control the temperature of the first electrically conductive housing section at least one of above a lower temperature threshold value or below an upper temperature threshold value, wherein the cooling apparatus is configured to control a temperature of a cooling medium that is located outside of the vacuum housing and directly interacts with the first electrically conductive housing section.

10. The X-ray tube of claim 1, wherein a shape of the first electrically conductive housing section has at least one corner at a height of the acceleration path.

11. The X-ray tube of claim 10, wherein the shape is rectangular or trapezoidal.

12. The X-ray tube of claim 1, wherein the first electrically conductive housing section is multi-layered, wherein a layer that is oriented toward the vacuum is electrically conductive, a layer that is oriented outward is electrically conductive and a layer that lies in between is electrically insulating.

13. An X-ray source comprising:

an X-ray emitter housing;

the X-ray tube of claim 1, the X-ray tube being in the X-ray emitter housing;

a high voltage supply configured to provide the high voltage; and a cooling apparatus.

14. The X-ray source of claim 13, further comprising:

a further X-ray tube, wherein a spacing between the X-ray tube and the further X-ray tube is smaller than an insulation path between the further X-ray tube and the X-ray tube.

15. An X-ray facility comprising:

the X-ray source of claim 13; and an X-ray detector.

16. The X-ray tube of claim 2, wherein the first electrically conductive housing section connects the cathode and the anode in an electrically conductive manner.

17. The X-ray tube of claim 16, wherein the electrical conductivity is at least one of (i) at a lower temperature threshold value is at least 10^−8 S/m or (ii) at an upper temperature threshold value is at most 10^−4 S/m.

18. The X-ray tube of claim 17, wherein the first electrically conductive housing section has at least one of flint glass, proceram, silicon nitride, silicon carbide, zirconium oxide, silicon or a doped material.

19. The X-ray tube of claim 18, further comprising:

a control unit; and a switching facility, wherein the control unit includes an interface configured to receive a measured value that maps the electrical conductivity of the first electrically conductive housing section and to compare the measured value with a threshold value, wherein the switching facility is configured to shut down the high voltage based on the comparison result.

20. The X-ray tube of claim 19, further comprising:

at least one of a temperature sensor configured to measure a temperature value as a measured value that maps the electrical conductivity of the first electrically conductive housing section, or a current sensor configured to measure a current value as a measured value that flows via the first electrically conductive housing section.

* * * * *